United States Patent
Ofenloch

(10) Patent No.: US 11,768,853 B2
(45) Date of Patent: Sep. 26, 2023

(54) SYSTEM TO COPY DATABASE CLIENT DATA

(71) Applicant: SAP SE, Walldorf (DE)

(72) Inventor: Dominik Ofenloch, Lampertheim (DE)

(73) Assignee: SAP SE, Walldorf (DE)

( * ) Notice: Subject to any disclaimer, the term of this patent is extended or adjusted under 35 U.S.C. 154(b) by 48 days.

(21) Appl. No.: 17/453,569

(22) Filed: Nov. 4, 2021

(65) Prior Publication Data
US 2023/0140730 A1  May 4, 2023

(51) Int. Cl.
G06F 16/30 (2019.01)
G06F 16/27 (2019.01)
G06F 16/23 (2019.01)
G06F 16/242 (2019.01)

(52) U.S. Cl.
CPC .......... G06F 16/27 (2019.01); G06F 16/2386 (2019.01); G06F 16/2433 (2019.01)

(58) Field of Classification Search
CPC ... G06F 16/27; G06F 16/2386; G06F 16/2433
See application file for complete search history.

(56) References Cited

U.S. PATENT DOCUMENTS

| | | |
|---|---|---|
| 2015/0066942 A1* | 3/2015 | Rees ............ G06F 16/2272 707/741 |
| 2017/0024438 A1* | 1/2017 | Kim ................ G06F 16/214 |
| 2018/0260435 A1* | 9/2018 | Xu ................. G06F 16/275 |
| 2020/0026714 A1* | 1/2020 | Brodt .............. G06F 16/275 |
| 2020/0034365 A1* | 1/2020 | Martin ......... G06F 16/24554 |
| 2020/0117653 A1* | 4/2020 | Zachrisen ......... G06F 16/27 |

* cited by examiner

*Primary Examiner* — Khanh B Pham
(74) *Attorney, Agent, or Firm* — Buckley, Maschoff & Talwalkar LLC

(57) ABSTRACT

Systems and methods to copy a plurality of source data records of a source client to a target client include deletion of a first set of target data records of a plurality of target data records associated with the target client, each of the first set associated with a key which is not identical to any key of a plurality of source data records, insertion of a second set of source data records into the plurality of target data records, each of the second set of source data records associated with a key which is not identical to any key of the plurality of target data records, and update of a third set of target data records associated with a key which matches a key of one of the fourth set of source data records and which is different from one of the fourth set of source data records.

13 Claims, 9 Drawing Sheets

| Execution | Source | Target | Copied Data |
|---|---|---|---|
| 1 | 100 | 200 | Full |
| 2 | 100 | 200 | Delta |
| 3 | 300 | 200 | Full |
| 4 | 300 | 200 | Delta |
| 5 | 300 | 200 | Delta |
| 6 | 100 | 200 | Full |
| 7 | 300 | 200 | Full |

*FIG. 6*

SYSTEM TO COPY DATABASE CLIENT DATA

BACKGROUND

Traditional computing system architectures include one or more servers executing applications which access data stored in one or more database systems. Users interact with an application to view, create and update the data in accordance with functionality provided by the application. The data may conform to an application-specific schema and the servers and database systems may be located on-premise and/or in cloud-based datacenters.

It is often desired to replicate the data of one client (i.e., source client) in another client (i.e., target client). Replication, also referred to as copying herein, describes a process which results in the data of the target client being identical to the data of the source client. In one example, the source client may reside in a production system and the target client might reside in a development system. Copying the data of the production system to the development system may allow testing of updated software on "real" data in the development system without disturbing the production system.

Conventionally, copying the source data of a source client to a target client begins by deleting all data from the target client. Once the deletion is complete, all the source data is copied from the source client to the target client. The copying process is similar regardless of whether the source client and the target client reside in the same or different database systems. In the latter case, the data is typically transferred from the database of the source client to the database of the target client over a Remote Function Call (RFC) connection.

The above-described copying significantly increases Central Processing Unit (CPU) consumption and memory load within the database system of the target client. These increases are particularly severe in the case of database systems which receive data into write-optimized data structures and subsequently merge the received data with read-optimized data structures.

Systems are desired to improve the efficiency with which source data of a source client is copied to target data of a target client.

BRIEF DESCRIPTION OF THE DRAWINGS

FIG. 6 is a tabular representation of a portion of a copy execution log according to some embodiments.

DETAILED DESCRIPTION

Figure 1A:
FIGS. 1A through 1D illustrate copying of source data of a source client to target data of a target client according to some embodiments.

The following description is provided to enable any person in the art to make and use the described embodiments and sets forth the best mode contemplated for carrying out some embodiments. Various modifications, however, will be readily apparent to those in the art.

Some embodiments address the foregoing by providing a copying process which does not require deleting of all data from a target client followed by copying of all source data to the target client. According to some embodiments, only those records of the target data of the target client which do not exist in the source data are deleted, as opposed to deletion of all the records of the target data of the target client. Next, the target data is updated to insert records of the source data which do not exist in the target data and records of the target data which are different from corresponding records in the source data are updated. The foregoing process may significantly decrease the execution time and the memory footprint of the copy process.

Embodiments may copy source data managed by a database system to target data managed by the same database system. Such a database system may execute Structured Query Language (SQL) operators (e.g., NOT EXISTS or EXCEPT) for comparing the managed data during the copying process. These operators are not available to compare source data and target data which are managed by different database systems. Accordingly, in a case that the source data of the source client and the target data of the target client are managed by different database systems, embodiments may retrieve the source data into the database system of the target client and perform the above-mentioned comparisons, insertions and deletions.

It may be preferable in some scenarios to perform the conventional source-to-target copy process described in the Background. For example, the conventional process may be faster and/or consume fewer resources if the source data of the source client differs significantly from the target data of the target client. The data may differ significantly if the target data is empty, or if the source client is a first organization and the target client is a different unrelated organization some scenarios, for example. Some embodiments may therefore operate to selectively perform the conventional copy process or the process described below based on current conditions.

FIGS. 1A through 1D illustrate a copy process according to some embodiments. For simplicity, FIGS. 1A through 1D assume that table 110 is the sole database table of source data of a source client, and table 120 is the sole database table of target data of a target client. Source data according to some embodiments may include any number of database tables and target data according to some embodiments may include any number of database tables. The number of database tables in the source data and the target data need not be equal, and zero or more of the database tables of the source data may share the same schema and semantics of a corresponding database table of the target data.

Tables 110 and 120 may be respectively stored in any type of database systems that are or become known. As will be described below, table 110 and table 120 may reside in a same or different database system. According to some embodiments, table 110 and table 120 may comprise records of a same database table stored in a single database system, with the records of table 110 being associated with a client ID (not shown) of the source client and the records of table 120 being associated with a client ID (not shown) of the target client.

Each record of each of tables 110 and 120 is associated with a key stored in key column Key. As is known in the art, within a given database table, each key is a unique identifier of the associated record of the table. As is also known in the art, a key may span one or more database columns.

It will be assumed that a process is initiated to copy source table 110 to target data, which currently includes table 120. As noted above, "copying" in this context refers to a process which results in the target data being identical to the source data. As will be described below, the process may be initiated by a database administrator.

Figure 1B:

As shown in FIG. 1B, the process initially includes deletion of records of table 120 of which identical records do not exist in source table 110. Specifically, it is determined that the record of table 120 identified by key=4 does not identically exist in table 110 because table 110 does not include a record having key=4. It is also determined that the record of table 120 identified by key=2 does not identically exist in table 110 because, although table 110 includes a record having key=2, the value of non-key field Col2 of the record in table 110 (i.e., D) is different from the value of non-key field Col2 of the corresponding record in table 120 (i.e., F). Accordingly, the records of table 120 identified by keys=2 and 4 are deleted therefrom, leaving the record associated with key=1.

Figure 1C:
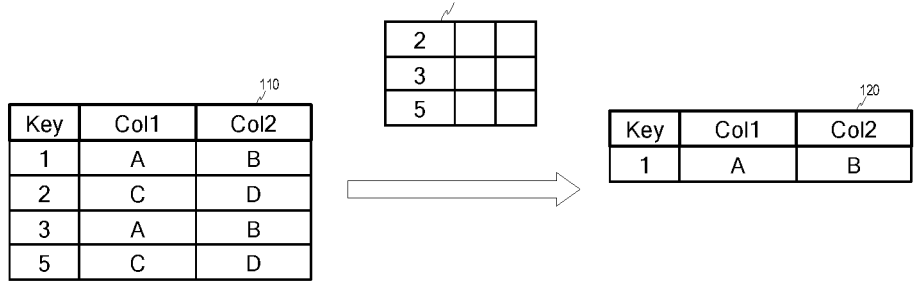
Figure 1D:

Next, records of table 110 are identified which do not exist in table 120. With respect to the former inquiry, the records of table 110 having keys=2, 3 and 5 are identified as not existing in table 120. As illustrated in FIG. 1C, table 120 is then updated based on the thusly-identified records 130. More specifically, and as shown in FIG. 1D, the identified records 130 which do not exist in table 120 are inserted in table 120. As a result, target table 120 is identical to source table 110.

Figure 2:
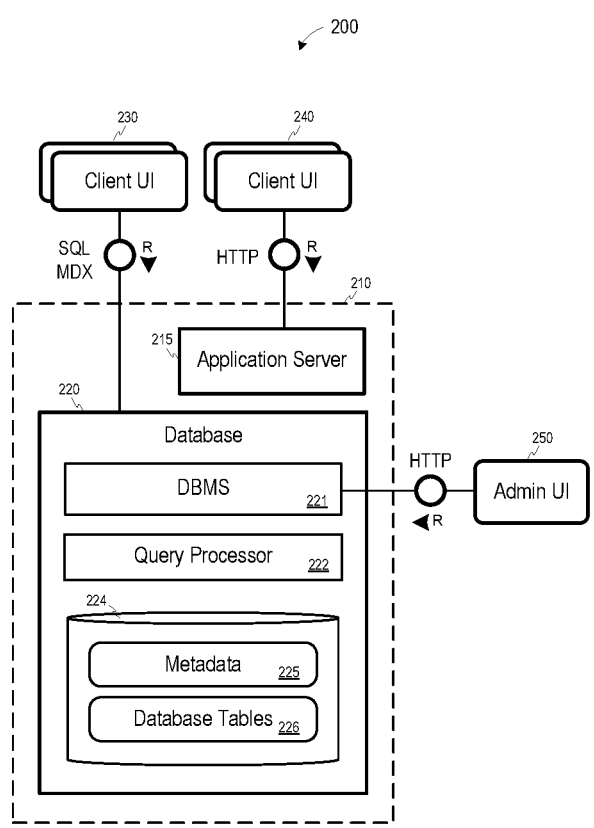
FIG. 2 is a block diagram of a database system according to some embodiments.

FIG. 2 is a block diagram of database system 200 according to some embodiments. It will be assumed that database system 200 stores data associated with a source client and data associated with a target client. Database system 200 may implement some embodiments to copy data of the source client to the data of the target client as described herein. Such a copying operation may be referred to as a local client copy.

The illustrated elements of database system 200 may be implemented using any suitable combination of computing hardware and/or software that is or becomes known. In some embodiments, two or more elements of system 200 are implemented by a single computing device. One or more elements of system 200 may be implemented as a cloud service (e.g., Software-as-a-Service, Platform-as-a-Service).

Database system 200 includes node 210 including application server 215 and database 220. Node 210 may support multi-tenancy to separately support multiple unrelated clients by providing multiple logical database systems whose logic and data are programmatically isolated from one another. A user of a first client who accesses node 210 is only provided with logic and data of the first client, while a user of a second client who accesses node 210 is only provided with logic and data of the second client.

Generally, application server 215 provides an execution environment and services for executing database applications, and database 220 is a query-responsive system for providing data to and storing data received from the applications. Some embodiments may provide one or more servers implementing application server 215 and a separate one or more servers implementing database 220.

Server node 210 may receive a query from one of client UI applications 230 and 240 and return results thereto based on data stored within database 220 and on data processing provided by an application executing on application server 215. For example, Web applications executing on application server 215 may receive Hypertext Transfer Protocol (HTTP) requests from client UI applications 240 as shown in FIG. 2.

Database 220 includes database management system (DBMS) 221 as is known in the art. DBMS 221 may receive and respond to database client requests and manage database transactions. DBMS 221 may also provide maintenance and administrative services including but not limited to garbage collection, backup and restore, transaction roll-back, configuration, storage optimization, a statistics service, etc. According to some embodiments, DBMS 221 includes processor-executable program code of a client copy tool which is executable to cause database 220 to perform a copying process as described herein. Such services and tools may be invoked and database 220 otherwise managed by an administrator via administrator UI 250.

Database 220 includes various database components such as query processor 221, which may comprise any suitable query processor that is or becomes known. Generally, query processor 221 receives a query (e.g., an SQL or Multi-Dimensional eXpression (MDX) statement) from a client, determines a query execution plan to execute the query against the data of storage device 224, executes the plan to produce a result set, and provides the result set to the client. Query processor 221 may also process SQL statements issued by various database management tools such as a client copy tool based on data stored in storage device 224.

Storage device 224 may comprise a persistent storage device such as but not limited to one or more hard disks, one or more Non-Volatile Random Access Memory devices, one or more Flash devices, etc. The data of storage device 224 may comprise one or more of conventional tabular data, row-stored data, column-stored data, and object-based data. Moreover, the data may be indexed and/or selectively replicated in an index to allow fast searching and retrieval thereof.

Metadata 225 includes data describing a database schema to which database tables 226 conform. Metadata 225 may therefore describe columns and properties of tables 226, the properties of each column of each table 226, the interrelations between the columns, and any other suitable information. Different ones of database tables 226 may be associated with different clients, as defined by metadata 225, while a single one of database tables 226 may include data of one or more clients, logically segregated by corresponding client IDs.

Database 220 may implement an "in-memory" database, in which a full database is loaded from storage device 224 and stored in volatile (e.g., non-disk-based) memory (e.g., Random Access Memory) of database 220 for use during database operation. Embodiments are not limited to an in-memory implementation. For example, data may be stored during operation in Random Access Memory (e.g., cache memory for storing recently-used data) and in storage device 224.

Figure 3:
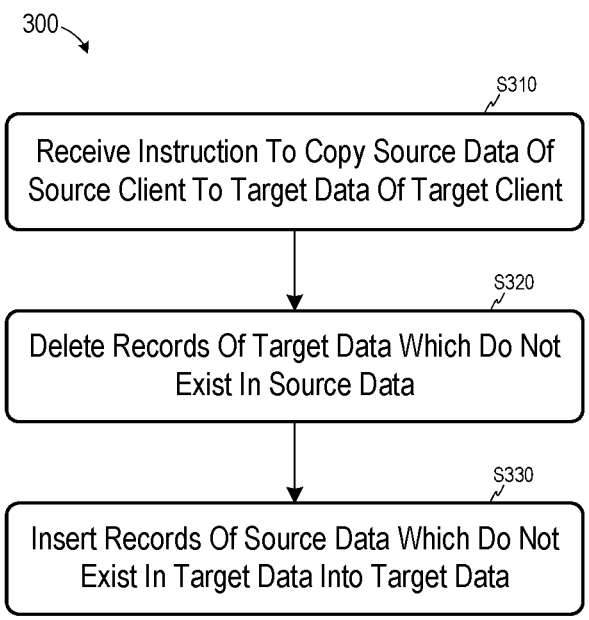
FIG. 3 is a flow diagram of a process to copy source data of a source client to target data of a target client according to some embodiments.

FIG. 3 comprises a flow diagram of process 300 to copy source data of a source client to target data of a target client according to some embodiments. Process 300 and all other processes mentioned herein may be embodied in processor-executable program code read from one or more of non-transitory computer-readable media, such as, for example, a hard disk drive, a volatile or non-volatile random access memory, a DVD-ROM, a Flash drive, and a magnetic tape, and then stored in a compressed, uncompiled and/or encrypted format. A processor may include any number of microprocessors, microprocessor cores, processing threads, or the like. In some embodiments, hard-wired circuitry may be used in place of, or in combination with, program code for implementation of processes according to some embodiments. Embodiments are therefore not limited to any specific combination of hardware and software.

Initially, at S310, an instruction is received to copy source data of a source client to target data of a target client. The instruction may be received from an administrator operating an administration UI of a DBMS. For example, a database administrator may access administrator UI 250 to submit the instruction to DBMS 221. Embodiments are not limited thereto.

Figure 4:
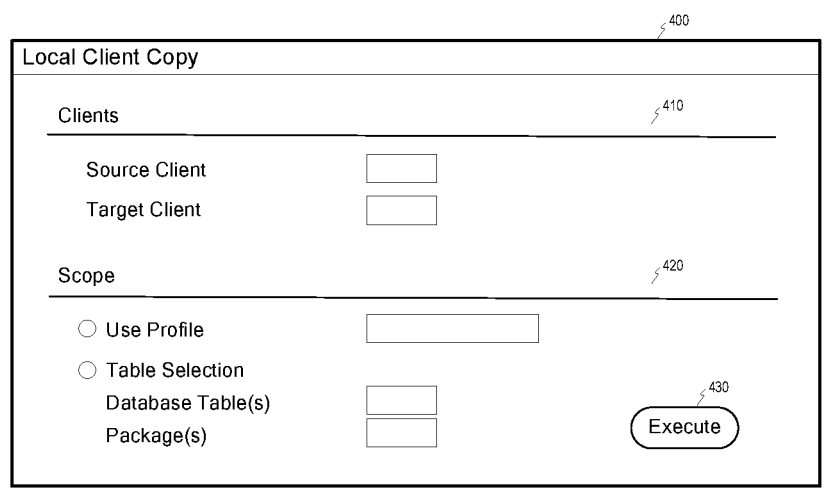
FIG. 4 is a user interface of a local client copy tool according to some embodiments.

FIG. 4 illustrates user interface 400 which may be presented by administration UI 250 according to some embodiments. User interface 400 may be presented by a Web browser executed by a computing device operated by an administrator. The administrator may operate the Web browser to access a Uniform Resource Locator associated with DBMS 221 and may be presented with user interface 400 in response.

User interface 400 includes input area 410 to specify a source client and a target client. Each client may be specified by a client ID in some embodiments. If the source data of the source client and the target data of the target client are stored on and managed by the same database system, the database system may execute standard query language statements which reference both the source data and the target data.

Input area 420 allows the administrator to specify various optional constraints of the copy operation. For example, the Use Profile control of area 420 allows the administrator to specify certain types of source data to be coped to the target data. The Table Selection control of area 420 allows the specification of particular database tables to copy. The administrator may select Execute control 430 to transmit an instruction to copy source data of the specified source client to target data of the specified target client, based on the constraints (if any) indicated in area 420. The instruction is received at S310.

After receipt of the instruction at S310, records of the target data which do not exist in the source data are deleted at S320. For example, any record of the target data which does not have an identical counterpart in the source data is deleted from the target data at S320. According to some embodiments, S320 is performed by transmitting a request to a query processor such as query processor 222 to execute the statement:

DELETE <target_client> WHERE NOT EXISTS(SELECT <source_client>)

Next, at S330, records of the source data which do not exist in the target data are inserted into the target data. S330 may comprise inserting any record of the source data having a key which does not exist in a corresponding table of the target data into the target data. According to some embodiments, S330 may be performed by requesting a query processor to execute the statement:

```
INSERT <target_client> FROM (
    SELECT <source_client> EXCEPT
    SELECT <target_client> )
```

After completion of process 300, the records of the target data are identical to the records of the source data.

In some scenarios, it may be desirable to perform a conventional copy operation instead of a copy operation as described with respect to FIGS. 1A-1D and/or FIG. 3. Generally, it is desirable to perform whichever copy operation will result in the smallest overall resource consumption.

Figure 5:
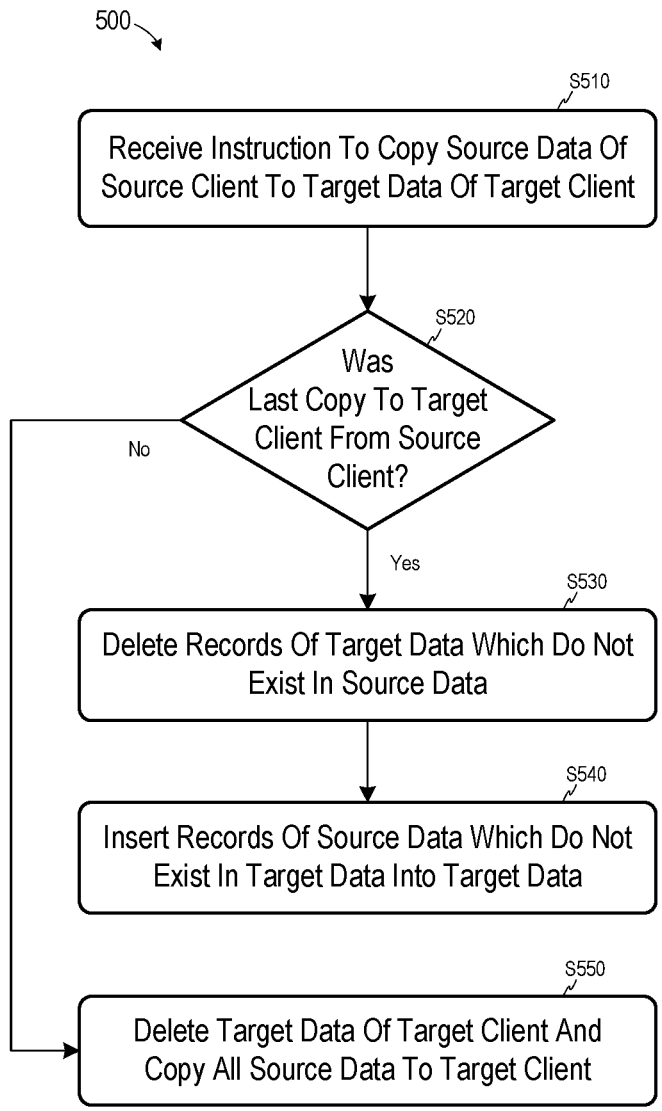
FIG. 5 is a flow diagram of a process to selectively use one of two algorithms to copy source data of a source client to target data of a target client according to some embodiments.

FIG. 5 comprises a flow diagram of process 500 to selectively perform either a conventional copy operation or a copy operation according to some embodiments. Initially, as described above, an instruction to copy source data of a source client to target data of a target client is received at S510.

Next, at S520, it is determined whether the source client of a last copy operation to the target client was the same source client as identified in the received instruction. S520 may include review of a client copy execution log which identifies the chronological order of all previously-executed copy operations, as well as the source client and target client of each copy operation. If the source client of a last copy operation to the target client was the same source client identified in the received instruction, it is assumed that the amount of data to delete and insert at the target client using the process of S320 and S330 is significantly less than would be the case if the source data and the target data were substantially unrelated. Accordingly, in such a situation, flow proceeds from S520 to execute S530 and S540 as described with respect to S320 and S330.

If the source client of a last copy operation to the target client was not the source client identified in the received instruction, it may be assumed that the source data and the target data are substantially different, such that the process of S320 and S330 would consume more resources than the conventional copy operation described above. Accordingly, if the source client of a last copy operation to the target client was not the source client identified in the received instruction, flow proceeds from S520 to S550 to delete all the target data of the target client and copy all of the source data to the target data.

FIG. 6 is a tabular representation of a portion of client copy execution log 600. Log 600 is presented to illustrate operation of process 500 according to some embodiments. Each record of log 600 is associated with a previously-executed copy operation to target client 200, and the Execution field of log 600 indicates the chronological order in which the copy operations were executed. The Copied Data field indicates the type of copy operation used at each execution, with Full indicating the conventional copy operation, and Delta indicating a copy operation as described herein.

As shown, Execution 2 was performed as a Delta copy operation because the source client (i.e., 100) of Execution 2 is the same as the source client of prior Execution 1. After Execution 2, an instruction was received to copy data of source client 300 to data of target client 200. Since the source client was not the same as the source client of prior Execution 2, Execution 3 was a Full copy operation.

The next two executions (4 and 5) were associated with a same source client and target client as Execution 2 and therefore each consisted of Delta copy operations. Execution 6 was triggered by an instruction to copy data of source client 100 to data of target client 200. Since the source client 100 was different than the source client of prior Execution 5, Execution 6 was a Full copy operation. Finally, Execution 7 was a copy operation of source client 300 to data of target client 200. Since the source client (i.e., 300) was different than the source client of prior Execution 5 (i.e., 100), Execution 7 was also a Full copy operation.

Figure 7:
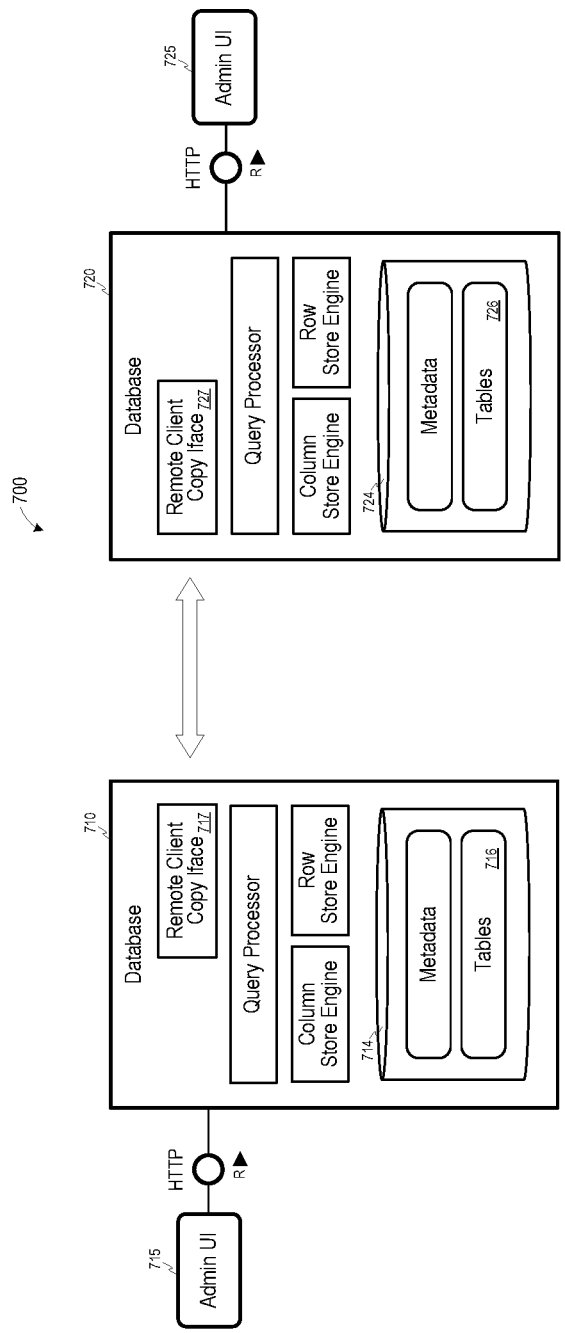
FIG. 7 is a block diagram of two database systems according to some embodiments.

FIG. 7 is a view of architecture 700 according to some embodiments. Architecture 700 includes database 710 storing data of a first client in tables 716 of storage 714, and database 720 storing data of a second client in tables 726 of storage 724. Either of databases 710 or 720 may be implemented on-premise or in a cloud service. Since the data of each client are located in different database systems, the data of one client cannot be copied to the other client using the copy operation described above with respect to FIGS. 1A-1D and/or FIG. 3. Specifically, SQL comparison operations (e.g., NOT EXISTS, EXCEPT) used to implement the above-described copy operation cannot be used unless the source data and the target data are located within a single database system.

Database 710 includes remote client copy interface 717 and database 720 includes remote client copy interface 727. Interfaces 717 and 727 may be used to transmit data from whichever of databases 710 or 720 stores source data of a copy operation to the other database (i.e., which stores target data of the copy operation) according to some embodiments as will be described below.

Figure 8:
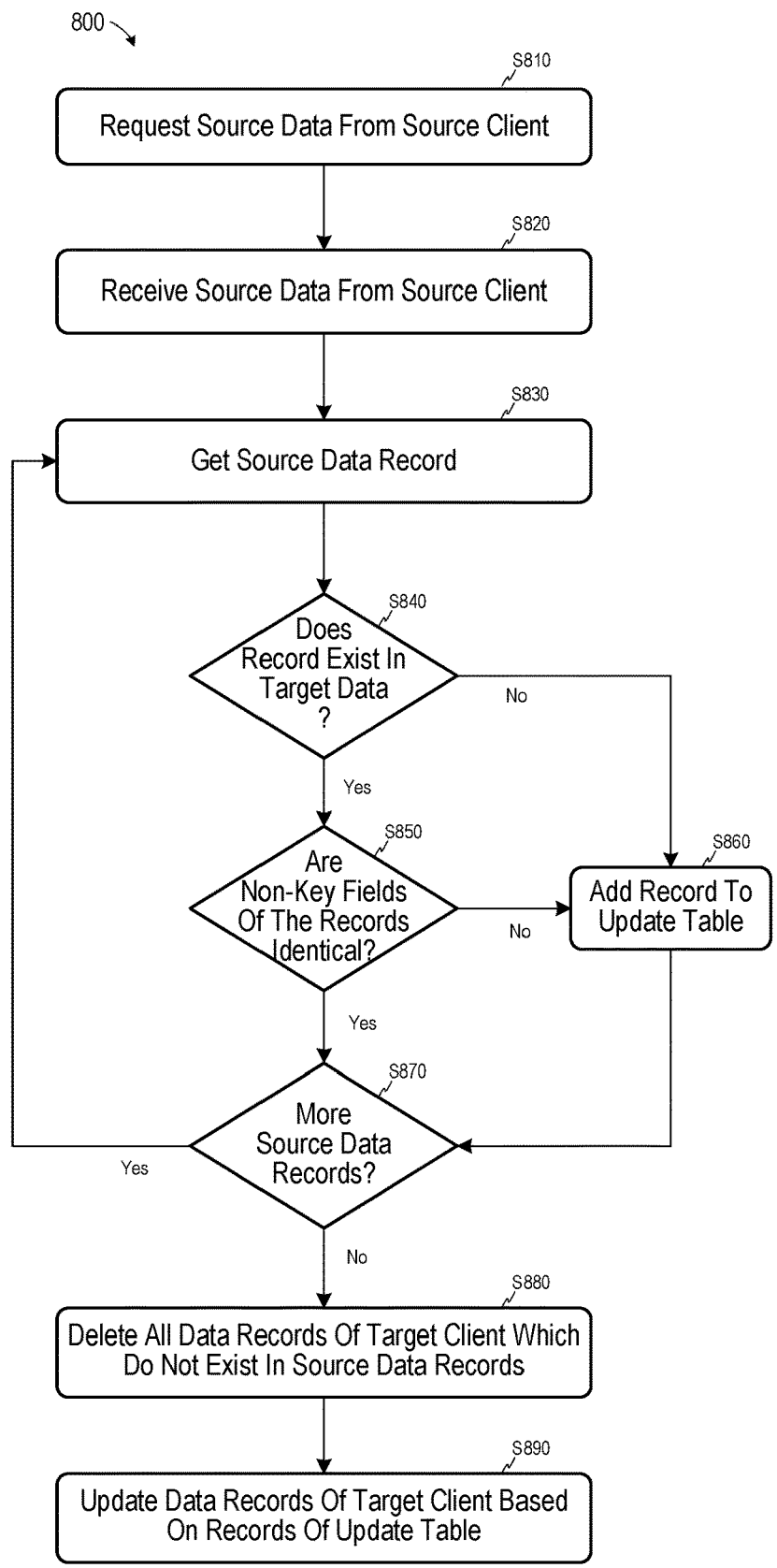
FIG. 8 is a flow diagram of a process to copy source data of a source client to target data of a remote target client according to some embodiments.

Process 800 of FIG. 8 provides a copy operation in a case that the source data and the target data reside in different database systems according to some embodiments. Process 800 assumes that an instruction has been received to copy source data from a source client to target data of a target client. The instruction is received by the database system of the target client, and process 800 is executed by the database system of the target client. With respect to FIG. 7, an administrator may operate administrator UI 725 to submit an instruction to database system 720 to copy source data of a source client stored within tables 716 of database system 710 to target data of a target client stored within tables 726 of database system 720.

The source data is requested from the source client database system at S810 in response to the instruction. For example, database system 720 uses remote client copy interface 727 to request all of the source data from remote client copy interface 717 over a Remote Function Call (RFC) connection. The received instruction to perform the copy operation may specify details of the RFC connection in order to facilitate the request at S810.

In response to the request, the source client database system may select all of the source data and serialize the selected data into temporary storage. The serialized data is then transferred (e.g., over the RFC connection) to the database system of the target client. The source data is received thereby at S820.

At S830, a first record of the source data is selected in the database system of the target client. It is then determined at S840 whether the source data record exists in the target data of the target client. The determination at S840 may include determination of whether a key of the source data record is identical to a key of a record of the target data. If not, the source data record is added to an update table of the target database system at S860.

If a data record corresponding to the source data record exists in the target data, flow proceeds to S850 to determine whether the non-key fields of the two records are identical. If not, the source data record is added to the update table at S860. If the non-key fields of the two records are identical, flow proceeds to S870 and returns to S830 if more source data records exist. Similarly, flow proceeds from S860 to S870 each time a source record is added to the update table.

Flow therefore cycles between S840 and S870 until all source data records have been processed. Once all source data records have been processed, the update table will include source data records which correspond to a target data record but which are not identical to the corresponding target data record. The update table will also include source data records which do not correspond to any target data record.

Next, at S880, all data records of the target client which do not exist in the source data records are identified (e.g., via their keys) and deleted. S880 may occur prior to or during the above-described population of the update table. The data records of the target client are then updated at S890 based on the records of the update table. For example, each record of the update table which shares a key with a record of the target data is used to update the record of the target data, and each record of the update table which does not share a key with a record of the target data is inserted into the target data. As a result, the target data of the target client and the source data of the source client are identical.

Some embodiments of process 800 may include logic to ensure that the size of the update table does not adversely affect memory usage and/or processing efficiency. For example, S860 may include a determination of whether a size of the update table has exceeded a pre-defined and/or dynamic threshold. If the size exceeds the threshold, the data records of the target client may be updated as described with respect to S890 based on the records of the current update table, after which the current update table is deleted and flow proceeds from S860 to S870.

Figure 9:
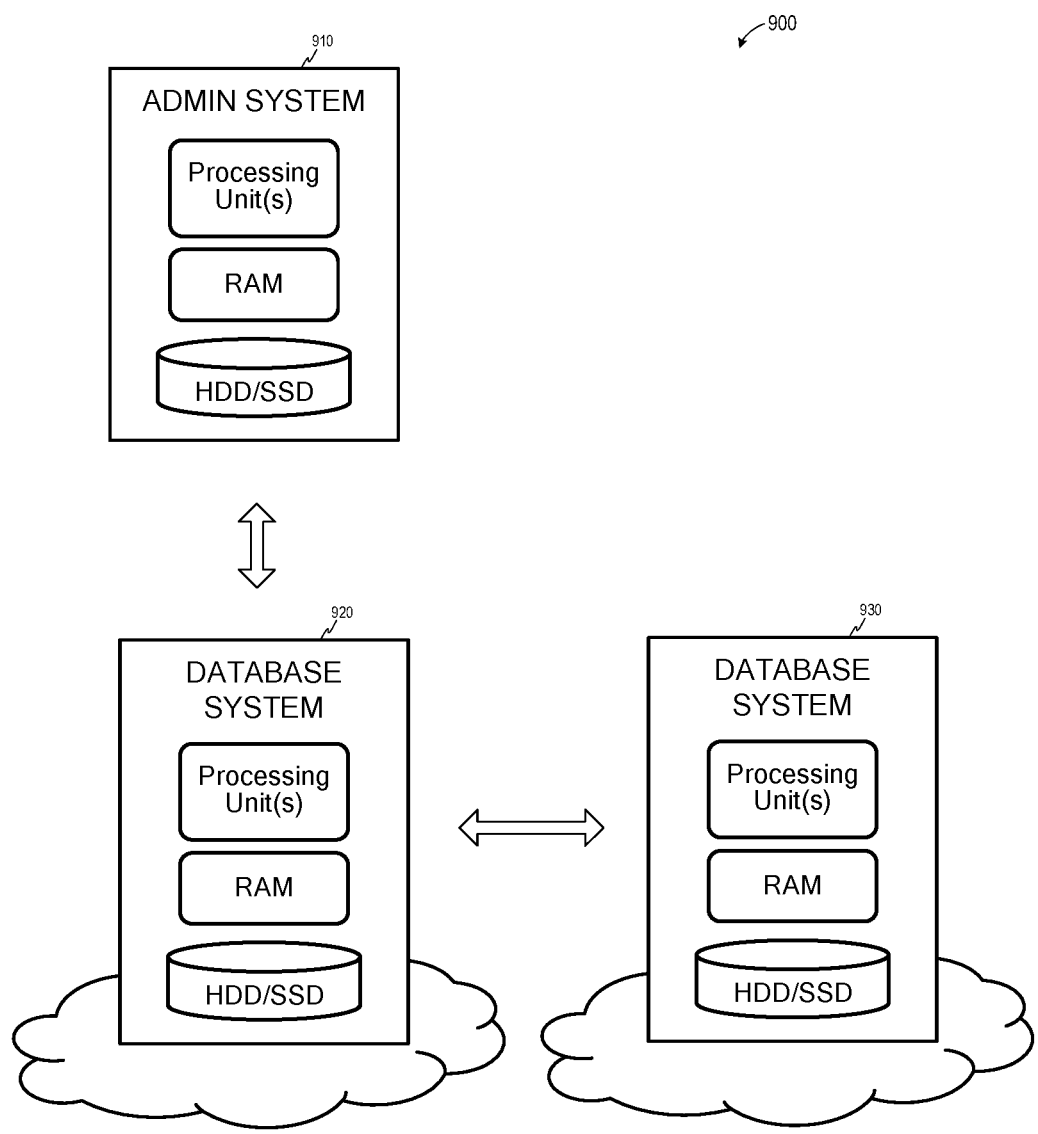
FIG. 9 is a block diagram of a cloud-based database system according to some embodiments.

FIG. 9 is a block diagram of landscape 900 according to some embodiments. Landscape 900 includes administrator system 910, cloud-based database 920 and cloud-based database 930. Databases 920 and 930 may be implemented within one or more public clouds providing self-service and immediate provisioning, autoscaling, security, compliance and identity management features.

Either or both of database systems 920 and 930 may execute program code to execute one or more of the processes described herein. In one example, a Web browser executing on administrator system 910 may be operated to instruct database system 920 to initiate a copy of source data of database system 930 to target data of database system 920 as described with respect to process 800.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
a memory storing processor-executable program code; and
a processing unit to execute the processor-executable program code in order to cause the system to:
receive a first instruction to copy source data records of a first source database to a target database;
in response to the first instruction, determine that a most-recent copy operation to the target database was to copy source data records of a second source database to the target database;
in response to the determination that a most-recent copy operation to the target database was to copy source data records of a second source database to the target database:
delete a plurality of target data records of the target database and copy the source data records of the first source database to the target database;
receive a second instruction to copy source data records of the first source database to the target database;
in response to the second instruction, determine that a most-recent copy operation to the target database was to copy source data records from the first source database to the target database;
in response to the determination that a most-recent copy operation to the target database was to copy source data records from the first source database to the target database:
delete a first set of target data records of the plurality of target data records of the target database, each of the first set of target data records associated with a key which is not identical to any key of the source data records associated with the first source database;
insert a second set of source data records of the source data records into the plurality of target data records, each of the second set of source data records associated with a key which is not identical to any key of the plurality of target data records; and
update a third set of target data records of the plurality of target data records based on a fourth set of the source data records, each of the third set of target data records associated with a key which matches a key of one of the fourth set of source data records and with at least one non-key field value which is different from a corresponding non-key field value of the one of the fourth set of source data records.

2. A system according to claim 1, further comprising a persistent storage device storing the plurality of target data records associated with the target database and the source data records associated with the first source database.

3. A system according to claim 2, wherein deletion of the first set of target records comprises execution of DELETE <target_database> WHERE NOT EXISTS(SELECT <source_database>).

4. A system according to claim 3, wherein insertion of the second set of source data records and update of the third set of target data records comprises execution of INSERT <target_database> FROM (SELECT <source_database> EXCEPT SELECT <target_database>).

5. A system according to claim 1, further comprising a persistent storage device storing the plurality of target data records associated with the target database, wherein the processing unit is to execute the processor-executable program code in order to cause the system to:
receive the source data records associated with the first source database from a remote system,
wherein insertion of the second set of source data records and update of the third set of target data records comprises creation of an update table including the second set of source data records and the fourth set of source data records.

6. A computer-implemented method comprising:
receiving a first instruction to copy source data records of a first source database to a target database;
in response to the first instruction, determining that a most-recent copy operation to the target database was to copy source data records of a second source database to the target database;
in response to the determination that a most-recent copy operation to the target database was to copy source data records of a second source database to the target database:
deleting a plurality of target data records of the target database and copying the source data records of the first source database to the target database;
receiving a second instruction to copy source data records of the first source database to the target database;
in response to the second instruction, determine that a most-recent copy operation to the target database was to copy source data records from the first source database to the target database;
in response to the determination that a most-recent copy operation to the target database was to copy source data records from the first source database to the target database:
deleting a first set of target data records of the plurality of target data records associated with the target database, each of the first set of target data records associated with a key which is not identical to any key of the source data records of the first source database;
inserting a second set of source data records of the source data records into the plurality of target data records, each of the second set of source data records associated with a key which is not identical to any key of the plurality of target data records; and
updating a third set of target data records of the plurality of target data records based on a fourth set of source data records, each of the third set of target data records associated with a key which matches a key of one of the fourth set of source data records and with at least one non-key field value which is different from a corresponding non-key field value of the one of the fourth set of source data records.

7. A method according to claim 6, wherein deleting the first set of target records comprises executing of DELETE <target_database> WHERE NOT EXISTS(SELECT <source_database>).

8. A method according to claim 7, wherein inserting the second set of source data records and updating of the third set of target data records comprises executing INSERT <target_database> FROM (SELECT <source_database> EXCEPT SELECT <target_database>).

9. A method according to claim 6, further comprising:
receiving the source data records of the first source database from a remote system,
wherein inserting the second set of source data records and updating of the third set of target data records comprises creating an update table including the second set of source data records and the fourth set of source data records.

10. A non-transitory medium storing processor-executable program code, the program code executable by a computing system to cause the computing system to:

receive a first instruction to copy source data records of a first source database to a target database;

in response to the first instruction, determine that a most-recent copy operation to the target database was to copy source data records of a second source database to the target database;

in response to the determination that a most-recent copy operation to the target database was to copy source data records of a second source database to the target database:

delete a plurality of target data records of the target database and copy the source data records of the first source database to the target database;

receive a second instruction to copy source data records of the first source database to the target database;

in response to the second instruction, determine that a most-recent copy operation to the target database was to copy source data records from the first source database to the target database;

in response to the determination that a most-recent copy operation to the target database was to copy source data records from the first source database to the target database:

delete a first set of target data records of the plurality of target data records of the target database, each of the first set of target data records associated with a key which is not identical to any key of the source data records associated with the first source database;

insert a second set of source data records of the source data records into the plurality of target data records, each of the second set of source data records associated with a key which is not identical to any key of the plurality of target data records; and update a third set of target data records of the plurality of target data records based on a fourth set of source data records, each of the third set of target data records associated with a key which matches a key of one of the fourth set of source data records and with at least one non-key field value which is different from a corresponding non-key field value of the one of the fourth set of source data records.

11. A medium according to claim 10, wherein deletion of the first set of target records comprises execution of DELETE <target_database> WHERE NOT EXISTS(SELECT <source_database>).

12. A medium according to claim 11, wherein insertion of the second set of source data records and update of the third set of target data records comprises execution of INSERT <target_database> FROM (SELECT <source_database> EXCEPT SELECT <target_database>).

13. A medium according to claim 10, wherein the program code is executable by a computing system to cause the computing system to:

receive the source data records associated with the first source database from a remote system, wherein insertion of the second set of source data records and update of the third set of target data records comprises creation of an update table including the second set of source data records and the fourth set of source data records.

\* \* \* \* \*